UNITED STATES PATENT OFFICE.

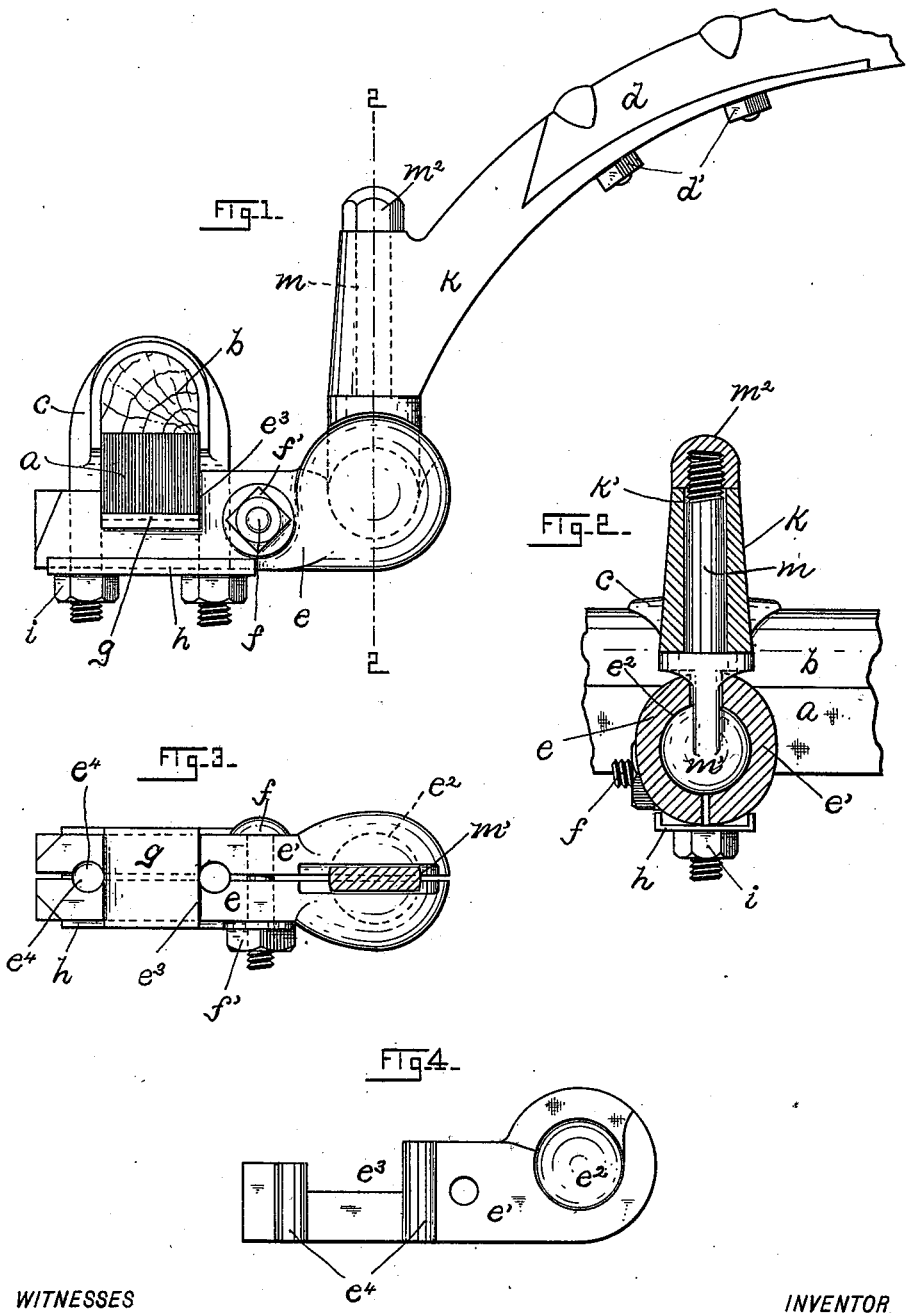

JOHN CLARKE, OF LIBERTY HILL, CONNECTICUT.

THILL-COUPLING.

SPECIFICATION forming part of Letters Patent No. 664,013, dated December 18, 1900.

Application filed June 11, 1900. Serial No. 19,838. (No model.)

*To all whom it may concern:*

Be it known that I, JOHN CLARKE, a citizen of the United States, residing at Liberty Hill, in the county of New London and State of Connecticut, have invented certain new and useful Improvements in Thill-Couplings, of which the following is a full, clear, and exact description.

The chief purpose of this invention is to provide a strong, serviceable, convenient, and reasonably cheap thill-coupling and one that shall include antirattling devices and which may be readily applied to the vehicle-gear by means of ordinary clips.

In carrying my said invention into effect I have so formed the several parts that they may be readily drop-forged or cast in malleable metal.

The accompanying drawings aid in explaining my said invention.

Figure 1 is a side elevation of a thill-coupling embodying my improvements; and Fig. 2 is a cross-sectional view of the same, taken on line 2 of said Fig. 1, looking toward the axle. Fig. 3 is a plan view of the two half parts $e$ and $e'$ of the socket-section, showing also the bolt and clips for binding said sections together, the neck of the ball-section being illustrated in transverse section. Fig. 4 is an inner face view of one of the said socket-sections.

In the drawings the letter $a$ denotes the axle of a vehicle, $b$ the usual bar of wood mounted thereon by means of a clip $c$, and $d$ indicates the rear end of the thill.

My coupling is of the ball-and-socket type—that is to say, the thill-iron is formed in part as a ball that is inclosed by a two-part socket in such manner that a movement of the ball within the socket may be had and so that the wear resulting from the constant movement of the ball within the said socket may be readily compensated for by adjusting the two-part socket.

Referring particularly to Figs. 1, 3, and 4, it will be seen that the two socket-sections $e$ and $e'$ are formed as right and left hand parts, having their confronting free ends cupped, as at $e^2$, and having their shank portions mortised or recessed, as at $e^3$, to fit snugly upon the under side of the axle. When the several parts of my coupling are properly assembled, the two socket-sections $e\ e'$ are so clamped together by means of a bolt $f$ and nut $f'$ that the socket incloses the ball, but leaves the latter free to move within the said socket. In order to further prevent the separation of the two socket-sections $e\ e'$, I place upon the shanks of the said sections, immediately beneath the axle, a clip or binder $g$, having downwardly-extending ribs on its opposite sides, that inclose the two socket-sections, as seen in Figs. 1 and 3, and I also place upon the under side of the said socket-sections a similar clip or binder $h$, that is of such length that it extends beyond the screw-threaded lower ends of the clip $c$, as is best seen in Figs. 1 and 3. The confronting faces of the socket-sections are provided with semicircular recesses $e^4$, that register with and receive the said screw-threaded ends of the clip $c$ when the several parts are assembled, and the two-part socket and the binders $g\ h$ are firmly secured to the axle and to each other by the usual nuts $i$, screwed home upon the clip ends, as seen in Figs. 1 and 2.

Secured to the thill $d$ by bolts $d'$ is the so-called "thill-iron" $k$, the rear end portion of said iron being provided with a vertical opening $k'$, in which is seated a bolt $m$, whose lower end is formed as a ball $m'$, that is inclosed by the described socket-sections $e\ e'$, as is best seen in Fig. 2. The bolt $m$ is retained in the thill-iron by a nut $m^2$, screwed upon its upper end. Whenever it becomes necessary to disconnect the thills from the vehicle to substitute a "pole" for thills or for any other reason, the thills may be quickly disconnected by simply removing the nuts $m^2$ and raising the thill-irons from the bolts $m$.

My described device may be readily attached to vehicle-gears as now commonly constructed and it may be quickly adjusted to compensate for wear and to prevent rattling.

Having thus described my invention, I claim—

1. In a thill-coupling, in combination, a thill-iron having a ball-shaped termination, a two-part socket adapted to inclose the said ball, binders $g\ h$ mounted respectively above and below the shanks of the two-part socket, and a bolt extending through and clamping together the said socket-shanks.

2. In a thill-coupling, in combination, a thill-iron, a bolt removably secured in said thill-iron and formed with a ball-shaped lower end, a two-part socket inclosing the said ball, binders $g\ h$ mounted respectively above and below the shanks of the socket parts, and a bolt extending through and clamping together the said socket-shanks.

Signed at Norwich, Connecticut, this 28th day of May, 1900.

JOHN CLARKE.

Witnesses:
FRANK H. ALLEN,
ALONZO M. LUTHER.